(12) United States Patent
Weimann et al.

(10) Patent No.: US 8,463,096 B2
(45) Date of Patent: Jun. 11, 2013

(54) DOUBLE JACKET OPTICAL FIBER CABLES

(75) Inventors: Peter A. Weimann, Atlanta, GA (US);
Robert Arthur Williams, Gainesville, GA (US)

(73) Assignee: OFS Fitel, LLC, Norcross, GA (US)

( * ) Notice: Subject to any disclaimer, the term of this patent is extended or adjusted under 35 U.S.C. 154(b) by 80 days.

(21) Appl. No.: 13/200,587

(22) Filed: Sep. 26, 2011

(65) Prior Publication Data

US 2013/0077922 A1   Mar. 28, 2013

(51) Int. Cl.
*G02B 6/44* (2006.01)

(52) U.S. Cl.
USPC ........... 385/112; 385/113; 385/114; 385/100; 385/111; 385/110; 385/109

(58) Field of Classification Search
USPC ................. 385/100, 102, 104, 105, 106, 107, 385/108, 109, 110, 111, 113, 103, 114, 141, 385/143, 145
See application file for complete search history.

(56) References Cited

U.S. PATENT DOCUMENTS

| | | | | |
|---|---|---|---|---|
| 5,043,037 | A  * | 8/1991 | Buckland | 156/166 |
| 8,165,439 | B2 * | 4/2012 | Overton | 385/106 |
| 8,175,434 | B2 * | 5/2012 | Davidson et al. | 385/113 |
| 2006/0159408 | A1 * | 7/2006 | Kim et al. | 385/109 |
| 2009/0304338 | A1 * | 12/2009 | Davidson et al. | 385/111 |
| 2010/0092138 | A1 * | 4/2010 | Overton | 385/110 |
| 2010/0215328 | A1 * | 8/2010 | Tatat et al. | 385/113 |
| 2012/0301091 | A1 * | 11/2012 | Dobbins | 385/109 |

* cited by examiner

*Primary Examiner* — Brian Healy
(74) *Attorney, Agent, or Firm* — Law Office of Peter V. D. Wilde

(57) ABSTRACT

Described are track-resistant all dielectric self-supporting (TR-ADSS) cables with improved cable jackets. A typical TR-ADSS optical fiber cable comprises an optical fiber subassembly, and a cable jacket system. The cable jacket system comprises an inner jacket, an aramid strength layer and an outer jacket. The improvement in the cable jacket system results from the addition of a friction layer between the aramid strength layer and the outer jacket. The friction layer prevents unwanted slippage of the outer jacket with respect to the inner portions of the cable.

10 Claims, 3 Drawing Sheets

DOUBLE JACKET OPTICAL FIBER CABLES

FIELD OF THE INVENTION

This invention relates to optical fiber cables. More specifically it relates to All-Dielectric Self Supporting (ADSS) optical fiber cables with multiple jackets.

BACKGROUND OF THE INVENTION

Parts of this Background May or May not Constitute Prior Art

All-Dielectric Self Supporting (ADSS) cables consist of an "inner" loose tube cable (strength members, tubes, and a thin jacket), a wrap of aramid yarns, and an outer jacket. The aramid yarn supports the weight of the cable over long aerial runs, and must accommodate variations in load due to temperature variation, wind, and ice buildup on the cable. A special kind of ADSS cable is track-resistant ADSS cable, referred to below as TR-ADSS cable, designed for high-voltage applications where the cable installation is subject to high electric fields. "Track resistant" jacketing prevents formation of pinholes in the jacket caused by "dry-band arcing".

The aramid yarn wrap and the track resistant jacket are typically applied during the last manufacturing step. In many or most cases, the aramid yarn wrap does not fully cover the inner polymer jacket. As a result, the track resistant jacket, which is molten as it is extruded, may stick to the inner jacket during the extrusion process. To avoid this sticking a separating tape may be used. A common choice for the separating tape is 0.001" thick, solid clear biaxially-oriented polyester (BOP). Mylar is a commercial brand name for this BOP material.

However, the use of separating tape may produce a new problem. When high tensile and torsion loads are imposed on double jacket TR-ADSS cables during installation, the outer jacket may slip and twist around the inner core. This failure is commonly referred to as "corkscrewing", since the cable looks like a corkscrew after failure.

BRIEF STATEMENT OF THE INVENTION

We have discovered that the use of a friction layer between the aramid yarn wrap and the outer jacket prevents unwanted slippage of the outer jacket.

DETAILED DESCRIPTION

Figure 1:
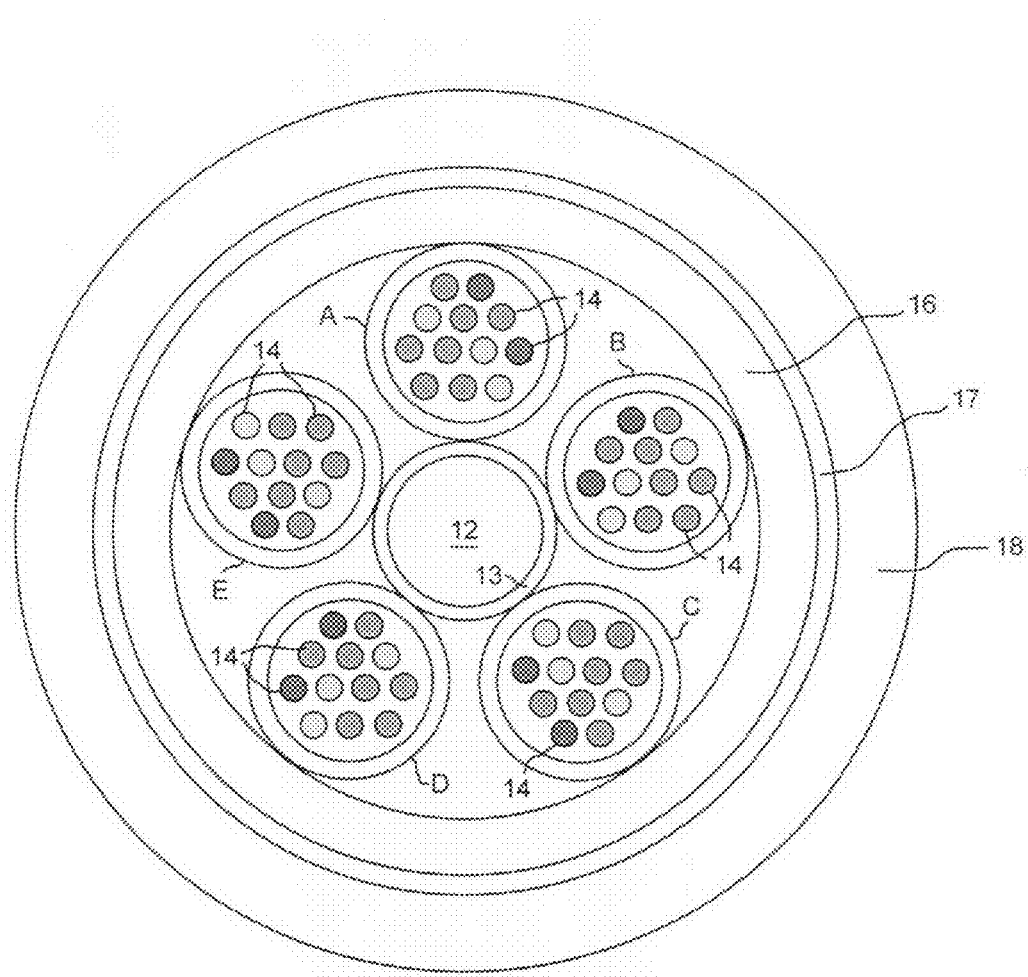
FIG. 1 is a schematic view of a typical double jacket TR-ADSS optical fiber cable of the prior art.

All dielectric self-supporting cables (ADSS) are widely known and widely used for transmission of optical signals. A typical ADSS cable structure is shown in FIG. 1, where A,B, C,D, and E are subunits of the cable, each containing a group of optical fibers 14 loosely encased in a polymer tube. The ADSS cable in FIG. 1 has 60 optical fibers, twelve in each subunit, but there may be many more or less. The center member 12 is a rigid epoxy-fiberglass composite strength member which can optionally have a polymer coating 13. The subunits are contained by inner jacket 16, an aramid strength layer 17, and an outer jacket 18. With the cable opened and the outer layers 16-18 removed, the subunits A-E are conveniently available for independently routing groups of optical fibers during installation in and around optical fiber terminals or closures.

For the purpose of describing this invention, a TR-ADSS optical fiber cable comprises an optical fiber sub-assembly, and a cable jacket system. In the embodiment shown in FIG. 1, the optical fiber sub-assembly comprises the sub-units just described. The cable jacket system is defined here as the inner jacket, the aramid strength layer and the outer jacket (elements 16, 17 and 18 in FIG. 1.)

ADSS cables in some applications are susceptible to a condition known as dry band arcing. For example, aerial deployment of optical cables along electrical power lines often produces this condition. Electric fields, which surround power lines, may induce potentially damaging electrical fields. These fields require the use of dielectric materials, and under certain environmental conditions the fields may induce arcing along the optical cable jacket. ADSS cables are suitable for deployment in distribution systems with voltages up to 275 kV, provided the cable is located in space where potentials do not exceed 20 kV. In some cases special jacket materials are used on ADSS cables to withstand high electrical fields. High space potentials have been shown to cause dry band arcing along cable surfaces, which can result in pitting and cracking of jacket materials over time. Eventually dry band arcing may cause the jacket to completely fail, exposing the aramid strength layer to damaging UV radiation, and eventually leading to catastrophic cable failure. Standard polyethylene jackets may safely be used in space potentials up to 12 kV. However, at higher space potentials, or in areas where high levels of pollution are present, special mineral-filled track resistant jacket materials may be required. Future electrical distribution system upgrades may also be considered when evaluating space potential compatibility. Without this, increases in transmission line voltages, or changes in the number or placement of electrical conductors, may obsolete the cable design selected.

Dry band arcing is dependent on the hardware configuration, the system voltage, environmental conditions, and the electrical resistance of the cable sheath material itself. The induced voltage difference between a mid-span section of the ADSS cable and any grounded section of the systems hardware creates a possibility of inducing current flow along the sheath. On a newly installed dry cable, the sheath resistance is quite high (>100 Ohm/m) so the induced currents are insignificant. However, as a cable ages from exposure to the sun's ultraviolet rays, contaminants such as salt and/or pollutants and moisture can affect the surface resistance of the cable. A thermoplastic track-resistant jacket with acceptable carbon black content and UV stabilization provides a three pronged solution to dry band arcing. First, the addition of a UV stabilization system including carbon black ensures the ADSS jacket will not prematurely age with UV exposure. This assures a high electrical resistivity of the cable jacket. UV aging of the jacket can allow collection of salt/pollution on the cable sheath lowering the cable resistance. Second, thermoplastic track resistant jacket materials minimize carbon surface tracking more effectively than cross-linked materials. Finally, the tough mineral-filled thermoplastic track resistant jacket will resist any heat or ablation damage if arcing does occur. ADSS cables with track-resistant jackets are referred to as track-resistant ADSS (TR-ADSS) cables, and are well known in the industry. Those skilled in the art are proficient in selecting a suitable TR-ADSS cable design for a given application.

An example of a commercially available TR-ADSS cable is PowerGuide®, produced by OFS Fitel LLC of Norcross Ga. It is available in optical fiber counts of 2-288, and is designed for installations with span lengths up to 1,000 meters or more. Typical applications are for self-supporting aerial use, over long spans including electric transmission towers and river crossings, power transmission and distribution networks, aerial-to-duct transitions, and in installations where electric field space potentials up to 25 kV or higher are present. PowerGuide® cables are available with optical fiber bundles or optical fiber ribbons.

For the purpose of this description the jacket material for the TR-ADSS optical fiber cable is defined as a mineral-filled polymer, preferably a thermoplastic polymer. This distinguishes the outer jacket material from conventional unfilled polymers used in non-track resistant cables, and the cross-linked filled materials used in some track-resistant cables. Examples of mineral fillings are magnesium hydroxide, calcium carbonate, aluminum trihydrate, talc, and fumed silica. The inner jacket material is typically an unfilled polymer such as medium-density polyethylene.

In typical TR-ADSS optical fiber cables, aramid yarns serve as the primary strength members. While these cables usually have a center strength member, the center strength member alone may not fulfill the tensile force requirement. If the installation conditions require more pulling tension, peripheral strength members can be added. Usually, peripheral strength members are added over the stranded core and below the inner sheath. In the case of all dielectric self supporting (ADSS) cables, peripheral strength members, typically in the form of aramid yarns, are commonly employed under the outer jacket and over the inner jacket. Aramid yarn layers provide added strength to withstand the pulling forces experienced by the cable during installation. Optical fiber cables used for lashed aerial application commonly employ aramid yarn layers, as do duct installations where high tensile strength is needed to meet high pulling forces. Aramid yarns used to strengthen optical fiber cables are basically nylons. The strength of aramid yarns is well known. Suppliers of aramid yarn include Dupont, Teijin, Kolon etc. Kevlar® (Dupont) is a widely used aramid yarn.

An extensive investigation was undertaken to study and analyze the cause of the TR-ADSS optical fiber cable failure described earlier. Two problems were identified with the cable jacket system. As previously mentioned, the cable jacket system is defined here as the inner jacket, the aramid strength layer and the outer jacket (elements 16, 17 and 18 in FIG. 1).

First, it was found that in some designs the outer jacket bonds to the inner jacket during extrusion of the outer jacket. This unwanted bonding is especially common in large cable designs where gaps in the aramid yarn layer allow contact between the inner and outer jackets. To address this, it has been recommended to add a Mylar layer between the aramid yarn layer and the outer jacket. While the added Mylar layer adequately prevents unwanted bonding between the jackets, it creates a second problem. That problem was mentioned earlier and referred to as "corkscrewing". It has been found that the low compressive strength of the anti-tracking outer jacket compound and the relatively low coefficient of friction between the inner surface of the clear Mylar separating tape and the aramid high strength layer combine to allow the outer jacket to slip easily over the aramid strength layer, rather than bind to it as designed. An important aspect of this discovery is that the main source of the unwanted slippage was not between the Mylar tape and the outer jacket, but was primarily due to slippage at the interface between the Mylar tape and the aramid strength layer.

Figure 3:
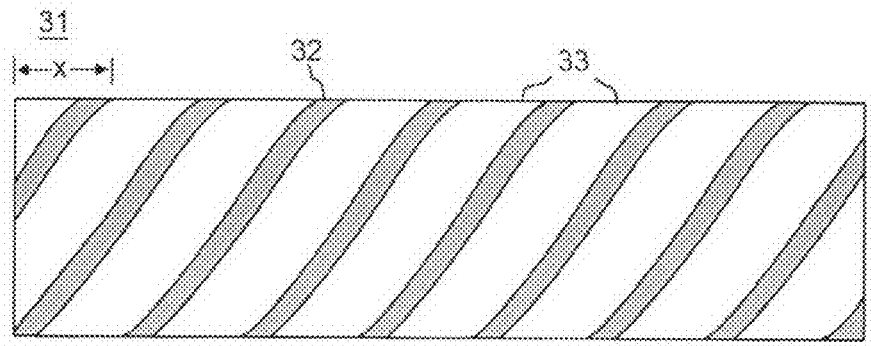
FIG. 3 is a view showing the aramid yarn wrap layer of the double jacket TR-ADSS optical fiber cable.

One illustration of the problem just described is shown by FIG. 3. In FIG. 3, a TR-ADSS optical fiber cable, in an intermediate stage of manufacture, is shown generally at 31. The intermediate stage of manufacture is the formation of the second layer of the cable jacket system, i.e., the application of the aramid yarn layer. Referring to FIG. 3, parts of the inner cable jacket are shown at 32. The aramid wrap layer is shown at 33. It is evident that the aramid wrap layer does not completely cover the inner cable jacket, with voids leaving portions 32 of the inner cable jacket exposed. If the outer cable jacket is extruded onto the partially formed cable shown in FIG. 3, significant portions of the outer cable may bond to the inner jacket.

In the specific configuration shown in FIG. 3, the length "x", a portion of the length dimension of the cable, is the longitudinal distance one complete circumferential aramid wrap travels along the cable length over one quadrant of one wrap. For any wrap angle, if the width of the tape W is less than 4x there will be gaps in the wrap layer.

It should be understood that the helical aramid yarn wrap configuration shown in FIG. 3 is an example only. A wide variety of wrap configurations may be used in TR-ADSS optical fiber cables of the invention. The lay may be right or left, or alternating right/left, and may be at any suitable angle. Alternatively, the yarn may be laid straight along the length of the cable. Problems similar to those described in connection with FIG. 3 may be encountered when the aramid yarn is laid straight along the TR-ADSS optical fiber cable.

The prior art approach to preventing mutual bonding between the cable jacket layers is to apply a separating tape to the assembly shown in FIG. 3. However, the separating tape introduces the problem of "corkscrewing" as described earlier.

Figure 4:
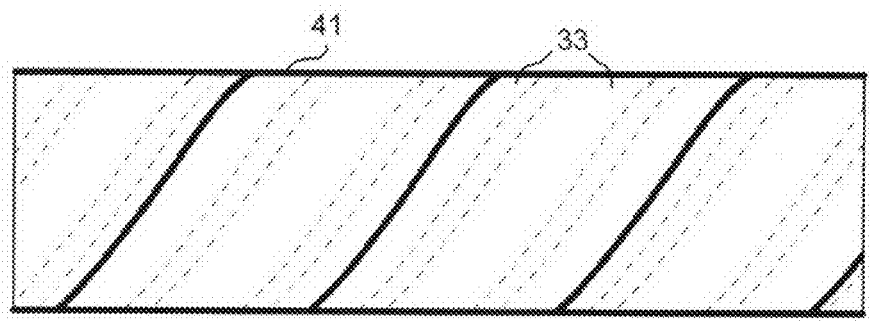
FIG. 4 is a view showing the added friction layer according to the invention.
Figure 5:
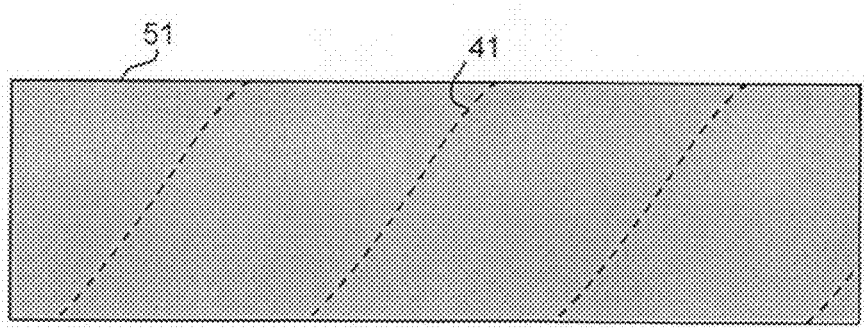
FIG. 5 is a view showing the outer jacket according to the invention.

According to the invention, an improved TR-ADDS cable structure incorporates a specially designed high friction layer between the aramid tape layer and the outer cable jacket. The result is an improved bond between the outer cable jacket and the aramid tape layer. This is shown in FIG. 4, where the friction layer is shown at 41. The previously applied aramid wrap is shown in phantom at 31. The friction layer is shown in a helical wrap. However, it may be applied as a longitudinal wrap, and this form of wrap may be preferred in some cases.

Figure 2:
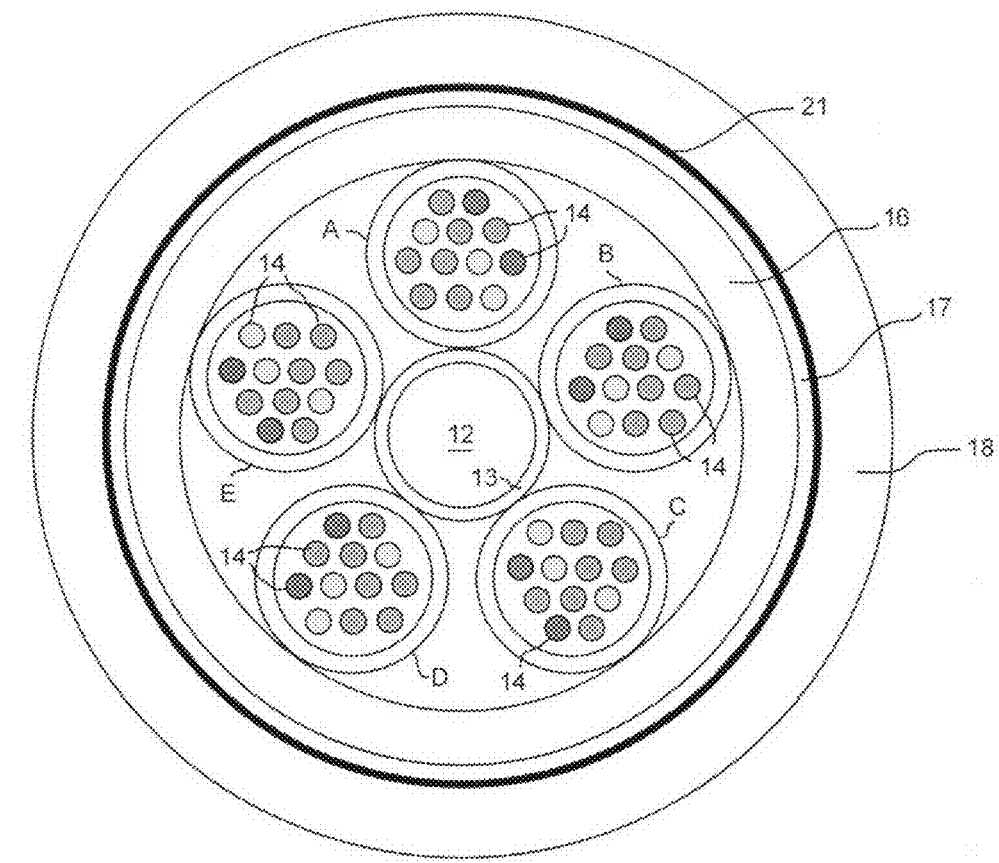
FIG. 2 is a schematic view of a double jacket TR-ADSS optical fiber cable with an added friction layer according to the invention.

The friction layer is also shown at 21 in FIG. 2.

In one specific embodiment, the friction layer is a polymer friction tape. A special characteristic of some polymer friction tapes is that they have a relatively higher friction on one surface of the tape than on the other surface. The tape may be applied to the cable so that the high friction surface of the tape contacts the interface that was identified as contributing the most to the slippage problem. Since the interface between the Mylar tape and the outer jacket was found to have acceptable friction, the friction on this side of the tape (outside) may remain unchanged. When a high friction tape layer is used, with the high friction side facing the aramid yarn layer, the coupling should be sufficient to withstand cable installation without corkscrewing. Thus, according to a preferred embodiment of the invention the tape in the friction tape layer has a higher friction value (with respect to any ordinary surface but here, specifically, to an aramid wrap strength layer) on one side of the tape than the other, and the side with the higher friction value is wrapped in contact with the aramid wrap strength layer. From this general description it will be evident to those skilled in the art that the term friction is used in the common sense, i.e., a shear force between two bodies.

To evaluate the performance of the cable jacket system of TR-ADSS cables a section of outer jacket approximately 12"-36" long was ring cut and pulled off the cable end by hand. If the jacket could be easily pulled off by hand it was deemed unacceptable. If it could not be pulled off by hand then it was considered acceptable. However, even jackets that could not be easily pulled off by hand sometimes resulted in "corkscrew" field failures. A more sophisticated pull test was developed to evaluate the effects of added friction layers in the cable jacket system.

A tensile tester was designed and engineered to replace the hand pull method. The tensile tester comprises an upper clamp and a lower clamp for engaging the ends of a cable section under test. The cable is hung vertically with weights attached to the lower clamp. Quantitative and qualitative evaluation of coupling of previous field failures indicated that a coupling value in excess of 100 pounds for a 12" long sample was required to meet the minimum installation requirements for this type of cable. It was found convenient to use a hook as the upper clamp, and to tie exposed ends of the aramid layer of the cable section under test to the hook.

At the lower clamp, the outer jacket of the cable is cut longitudinally into equal tab sections. The core and aramid strength members are removed to provide two equal tabs for clamping to the lower end of the tester. The outer jacket tabs are clamped in a manner that allows the aramid strength members to slip with respect to the jacket.

The cable section under test is pulled at a rate of ~1" per minute until the outer jacket slips excessively or the outer jacket fails. Based on extensive testing, excessive slippage was found to be any value greater than 10 mm. Slippage at or below 10 mm was found to be acceptable. The cable tester just described was used to evaluate the efficacy of various friction layer materials in coupling the outer cable jacket to the aramid strength layer. These are classified according to the weight applied by the tester to induce cable jacket slippage or failure.

The layers tested were:
- "M100C", manufactured by Neptco in Pawtucket, R.I. This is a Mylar tape with a white color coating which is somewhat tacky;
- "COR142", also manufactured by Neptco, an uncoated Mylar tape which is corrugated;
- "CTL200", manufactured by Scapa in Renfrew, Ontario, Canada. This is a Mylar tape coated with a thin non-woven polyester that has a rough surface.

Two sets of trials were run to evaluate the relative coupling values of different candidate friction tapes and compare them with the incumbent combinations of clear Mylar tape with various aramid tape layers. Scapa CTL200 and Neptco M100C were regarded as preferred because of their apparent higher coefficient of friction value on one side.

Data from the first trial is shown in the table below (labeled trial T-10-103). Samples with acceptable coupling values fail in the sample jacket tabs by elongating or breaking before the outer jacket slips significantly, i.e., <10 mm.

| Trial No. T-10-103 | | | | |
|---|---|---|---|---|
| Aramid (22 ends)- Separating Tap | Sample No. | Max 12" Coupling (lb) | Jacket Slip (mm) | Comments |
| DuPont 8520 - Clear Mylar | 1 | 60 | Stopped test @ 25 mm | Continuous slip - Fail |
| DuPont 8520 - Clear Mylar | 2 | 75 | Stopped test @ 41 mm | Started slipping @ 35 lb. - Fail |
| DuPont 8520 - Clear Mylar | 3 | 60-81 | Stopped test @ 18 mm | Continuous slip - Fail |
| DuPont 8520 - Scapa CTL200 | 1 | 183 | 6.2 mm | Pass |
| DuPont 8520 - Scapa CTL200 | 2 | 176 | 3.5 mm | Pass |
| DuPont 8520 - Scapa CTL200 | 3 | 183 | 8 mm | Pass |
| Tejin Twaron - Clear Mylar | 1 | 121 | Stopped test @ 24 mm | Continuous slip - Fail |
| Tejin Twaron - Clear Mylar | 2 | 115 | Stopped test @ 25 mm | Started slipping @ 55 lbs. - Fail |
| Tejin Twaron - Clear Mylar | 3 | 161 | Stopped test @ 23 mm | Started slipping @ 70 lbs. - Fail |
| Tejin Twaron - Scapa CTL200 | 1 | 175 | 4 mm | Pass |
| Tejin Twaron - Scapa CTL200 | 2 | 191 | 3 mm | Pass |
| Tejin Twaron - Scapa CTL200 | 3 | 193 | 2 mm | Pass |

Data from the second trial is shown in the table below (labeled trial T-10-140). DuPont Kevlar was used on the second set of trials to provide higher coupling.

| Trial No. T-10-140 | | | | |
|---|---|---|---|---|
| Aramid (22 ends) - Separating Tape | Sample No. | Max. 12" Coupling (lb) | Jacket Slip (mm) | Comments |
| DuPont 8520 - Clear Mylar | 1 | 80 | Stopped test @ ~20 mm | Continuous slip - Fail |
| DuPont 8520 - Clear Mylar | 2 | 70 | Stopped test @ ~20 mm | Continuous slip - Fail |
| DuPont 8520 - Clear Mylar | 3 | 64 | Stopped test @ ~20 mm | Continuous slip - Fail |
| DuPont 8520 - Neptco COR142 | 1 | 83 | Stopped test @ ~20 mm | Continuous slip - Fail |
| DuPont 8520 - Neptco COR142 | 2 | 80 | Stopped test @ ~20 mm | Continuous slip - Fail |
| DuPont 8520 - Neptco COR142 | 3 | 90 | Stopped test @ ~20 mm | Continuous slip - Fail |
| DuPont 8520 - Neptco M100C | 1 | 189 | 0-6 mm | Pass |
| DuPont 8520 - Neptco M100C | 2 | 192 | 0-6 mm | Pass |
| DuPont 8520 - Neptco M100C | 3 | 210 | 0-6 mm | Pass |
| DuPont 8520 - Scapa CTL200 | 1 | 183 | 0-8 mm | Pass |
| DuPont 8520 - Scapa CTL200 | 2 | 176 | 0-8 mm | Pass |
| DuPont 8520 - Scapa CTL200 | 3 | 183 | 0-8 mm | Pass |

Minimum outer jacket coupling values were set as shown in the table below based on very low slippage. As would be expected by those skilled in the art, the coupling is dependent on the cable diameter. A larger diameter cable provides a higher friction surface area.

| Cable Construction | Minimum Coupling for 12" Sample |
| --- | --- |
| ≧12 position cables | 275 pounds |
| >5 but <12 position cables | 175 pounds |
| 5 position cables | 150 pounds |

The inner diameter of the outer jacket in the five position cable had a diameter of approximately 0.5 mm and the recommended coupling value is greater than 150 lbs. This parameter largely determines the coupling area for a given TR-ADSS cable subject to the invention.

For the case of a 72f cable, where a coupling value of 200 lbs is recommended, the finished cable has an OD of 15.2 mm (0.597"); the outer jacket is 1.4 mm thick, nominal, so it has a nominal inner diameter of 12.4 mm.

So for the case of a 5-position cable, with up to 60 fibers:
150 lbf/1.407" circumference=106.6 lbf per inch of width. (SI units, 18.66 N/mm outer jacket circumference)
For the case of a 6-position cable, with 72 fibers:
200 lbf/1.534" circumference=130.4 lbf/inch of width (SI units, 22.83 N/mm outer jacket circumference)

In concluding the detailed description, it should be noted that it will be obvious to those skilled in the art that many variations and modifications may be made to the preferred embodiment without substantial departure from the principles of the present invention. All such variations, modifications and equivalents are intended to be included herein as being within the scope of the present invention, as set forth in the claims.

The invention claimed is:

1. An optical fiber cable comprising an optical fiber sub-assembly, and a cable jacket system surrounding the optical fiber sub-assembly, the cable jacket system comprising:
 a) a polymer inner cable jacket,
 b) a polymer strength layer surrounding the polymer inner cable jacket,
 c) a polymer friction tape layer surrounding the polymer strength layer and,
 d) an outer polymer cable jacket surrounding the friction tape layer,
wherein the friction tape layer couples layer b) to layer d) to prevent relative slippage between layers b) and d) of more than 10 mm under a tensile load of greater than 150 lbs.

2. The optical fiber cable of claim 1, wherein the polymer strength layer comprises a wrap of aramid yarn.

3. The optical fiber cable of claim 2, wherein the optical fiber cable is a track-resistant ADSS cable and the outer polymer jacket comprises a mineral-filled material.

4. The optical fiber cable of claim 3, wherein the optical fiber cable comprises a thermoplastic material.

5. The optical fiber cable of claim 3, wherein the inner polymer cable jacket comprises an unfilled polymer.

6. The optical fiber cable of claim 3, wherein the polymer friction tape layer is a longitudinal wrap.

7. The optical fiber cable of claim 6, wherein the aramid tape layer is a helical wrap.

8. The optical fiber cable of claim 7, wherein the longitudinal distance one complete circumferential aramid wrap travels along the cable length over one quadrant of one wrap is x, and the width of the tape W is less than 4x.

9. The optical fiber cable of claim 3, wherein the polymer friction tape layer has a higher friction value on one side of the tape than the other, and the side with the higher friction value is wrapped in contact with the aramid wrap strength layer.

10. The optical fiber cable of claim 3, wherein the inner polymer cable jacket comprises polyethylene.

* * * * *